F. STEBLER.
FRUIT CLEANER.
APPLICATION FILED MAY 13, 1918.

1,296,130.

Patented Mar. 4, 1919.
3 SHEETS—SHEET 2.

Fig. 2

Witnesses:
Sully Russo
Lutto A. Alter

Inventor
Fred Stebler
By Frederick S. Lyon
Atty

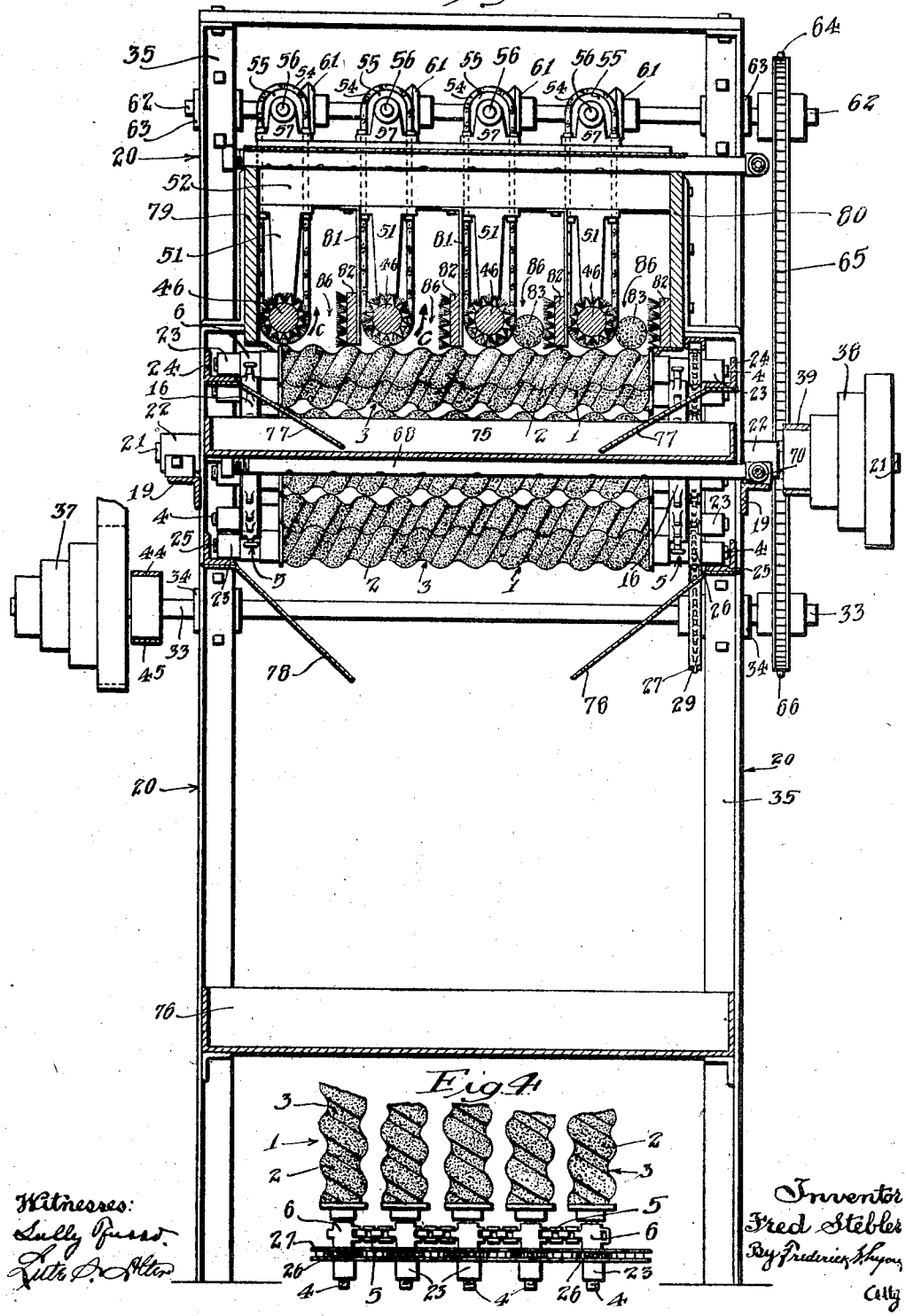

UNITED STATES PATENT OFFICE.

FRED STEBLER, OF RIVERSIDE, CALIFORNIA.

FRUIT-CLEANER.

1,296,130.

Specification of Letters Patent.

Patented Mar. 4, 1919.

Application filed May 13, 1918. Serial No. 234,052.

*To all whom it may concern:*

Be it known that I, FRED STEBLER, a citizen of the United States, residing in Riverside, in the county of Riverside and State of California, have invented a new and useful Fruit-Cleaner, of which the following is a specification.

This invention relates to machines for cleaning citrus and other fruits and an important object is to provide a cleaner capable of cleaning a large quantity of fruit thoroughly and expeditiously and without bruising or otherwise injuring the skin of the fruit.

Another object is to provide a fruit cleaner which may be used as an elevator or conveyer so that the fruit while being cleaned may be conveyed or elevated to a drier or to any desired place for packing of the fruit or for other purposes.

Another object is to provide for the turning over of the fruit a number of times in various directions while it is subjected to the cleaning process, thus causing the entire surface of each fruit body to be subjected to the cleaning action.

Another object is to provide a cleaning machine in which while the fruit is conveyed therethrough it shall be subjected to the action of brushing means.

Another object is to insure that every portion of the surface of the fruit peel will be frequently subjected to a thorough scrubbing action.

Another object is to make provision for causing the pieces of fruit, while passing through the cleaning machine, to be held almost continuously against a rotating brush extending lengthwise of the machine.

A further object is to provide a cleaning machine which is of relatively simple construction and one which may be operated at a comparatively low cost.

Other objects and advantages will appear in the subjoined detail description.

The accompanying drawings illustrate the invention:

Fig. 2 is a plan view of Fig. 1.

Fig. 3 is a vertical section on line indicated by $x^3-x^3$, Fig. 1.

Fig. 4 is an enlarged fragmentary plan view of the conveyer.

Figure 1:
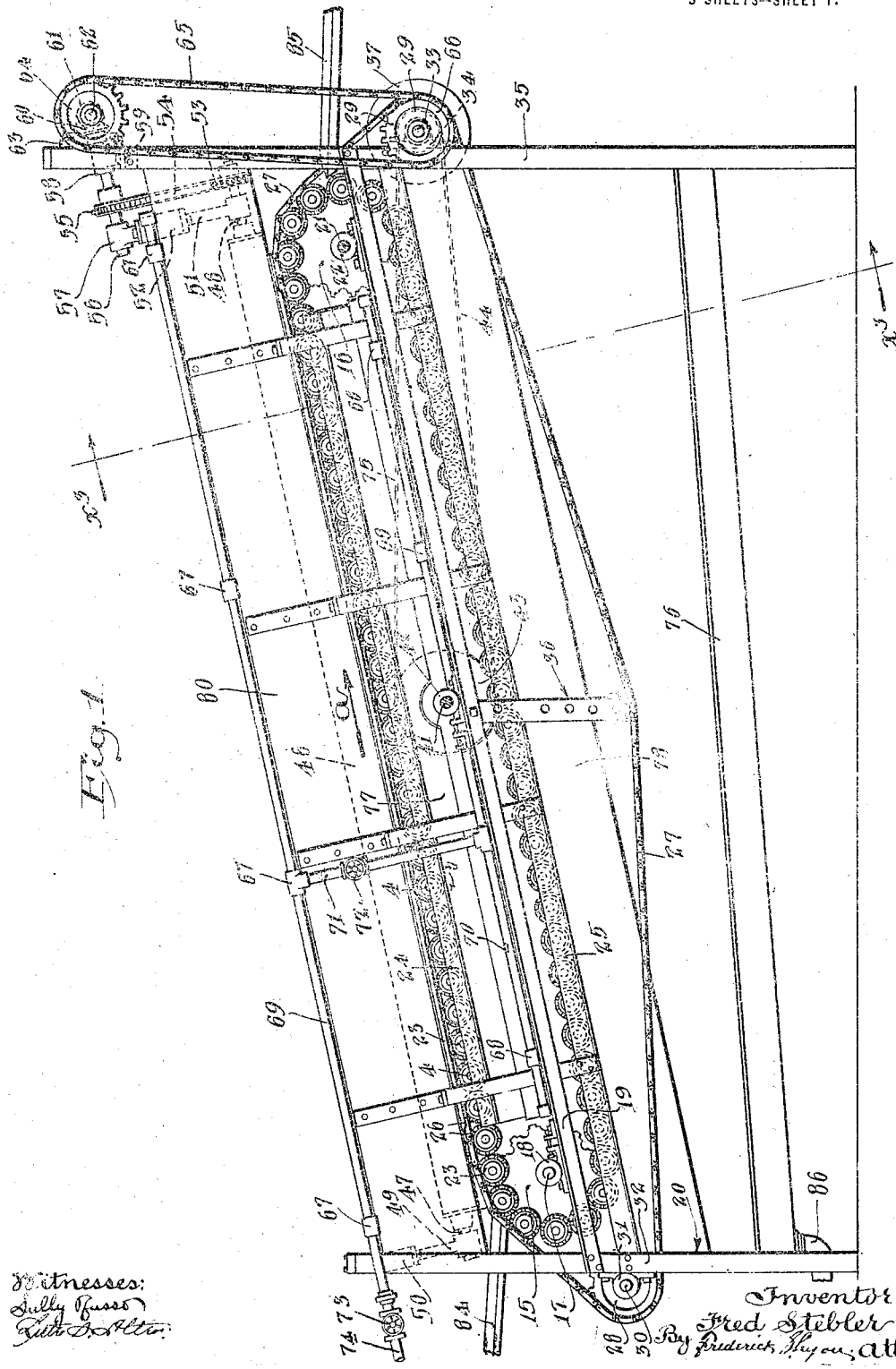
Figure 1 is a side elevation of a fruit cleaner embodying the invention.

The conveyer is indicated in general by the character 1 and said conveyer comprises transverse rotary scrubbing and cleaning members which may be in the form of brushes 2 of suitable construction. The brushes 2 are of circular cross section and the bristles, or other brushing and scrubbing surface, are arranged to produce an uneven surface and may form a spiral groove 3 so that rotation of the brushes will tend to cause the fruit to travel toward one end of the brushes. The spiral grooves 3 are formed in the same direction for all of the transverse brushes. The brushes 2 are provided with shafts 4 and adjacent shafts are connected to one another by chains 5 which include journals 6 for the shafts 4. The chains 5 are rove around a pair of sprocket wheels 15 at one end of the machine and a pair of sprocket wheels 16 at the opposite end. The sprocket wheels 15 are fast on a shaft 17 mounted in adjustable bearings 18 on longitudinally extending members 19 of the frame which is indicated in general by the character 20 and which may be of any suitable construction. The sprocket wheels 16 are fast on a shaft 21 which is journaled in adjustable bearings 22 that are mounted on the longitudinal members 19.

The shafts 4 are provided near their ends with rollers 23 adapted to run on upper and lower tracks 24, 25 respectively, said tracks in the instance shown being formed by angles. Fast on each of the shafts 4 adjacent the rollers 23 at one end of said shaft is a sprocket wheel 26 which engages a sprocket chain 27 rove around sprocket wheels 28, 29 at opposite ends of the frame 20, the sprocket wheel 28 being fast on a shaft 30 journaled in a bearing 31 which is mounted on end standards 32 of the frame. The sprocket wheel 29 is fast on a shaft 33 which is journaled in bearings 34 mounted on end standards 35 of the frame. If desired a chain tightening device 36 of any suitable construction may be provided for the chain 27 to keep the chain at the desired degree of tautness. It is clear that driving the chain 27 will cause rotation of the brushes 2 about their axes and that driving of the shaft 21 will cause progressive movement of the conveyer rollers 22 along the frame. The direction of travel of the conveyer is indicated by the arrow $a$, Fig. 1, and the direction of rotation of the brushes 2 about their axes is indicated by the arrow $b$.

The shaft 33 may be driven by a stepped pulley 37 and the shaft 21 may be driven by a stepped pulley 38 connected by a belt 39 to a stepped pulley 40 fast on a transversely extending countershaft 41 which is journaled in bearings 42 mounted on the longitudinal frame members 19. The shaft 41 is provided with a pulley 43 which is driven by a belt 44 from a pulley 45 mounted on the shaft 33. Any other suitable driving connections may of course be provided for the shafts 21, 33 in lieu of those just described.

Mounted just above the upper run of the conveyer 1 are longitudinally extending rotary scrubbing and washing members which may be in the form of brushes 46 of circular cross section. Any desired number of these brushes 46 may be provided, as desired, and in the instance shown in the drawings there are four of them. The brushes 46 are provided at their opposite ends with shafts 47, 48, the shafts 47 being journaled in bearings 49 which are suspended from a cross member 50 of the frame. The shafts 48 are journaled in bearings 51 suspended from a cross member 52 of the frame, and said shafts 48 are provided with sprocket wheels 53 respectively driven by sprocket chains 54 which engage sprocket wheels 55 fast on jackshafts 56. The jackshafts 56 are journaled in bearings 57 mounted on the cross member 52, and said shafts 56 are journaled also in bearings 58 which are mounted on a cross member 59 of the frame. The jackshafts 56 are provided with bevel gears 60 meshing with bevel gears 61 on a shaft 62 which is journaled in bearings 63 that are mounted on the end standards 35 of the frame. The shaft 62 is driven by a sprocket wheel 64 which in turn is driven by a sprocket chain 65 from a sprocket wheel 66 fast on the shaft 33. In Fig. 3 the direction of rotation of the longitudinal brushes 46 is in the direction of the arrow c.

Arranged transversely of the frame above the longitudinal brushes 46 are spray nozzles 67 and also arranged transversely of the frame between the upper and lower runs of the conveyer 1 are spray nozzles 68. The spray nozzles 67 are supplied with water through a longitudinally extending pipe 69 and the nozzles 68 are supplied with water through a longitudinally extending pipe 70. The pipes 69, 70 are connected with one another by a pipe 71 in which is a valve 72. The pipe 69 is provided with a valve 73 which in turn is connected by a supply pipe 74 to any suitable water supply source, not shown.

A tray 75 is provided beneath the upper run of the conveyer 1 and a tray 76 is provided beneath the lower run of the conveyer, said trays being for the purpose of catching the water draining from the fruit and conveyer and supplied by the nozzles 67, 68.

Deflecting plates 77, 78 are provided beneath the upper and lower runs of the conveyer 1, said plates sloping inward and downward, the plates 77 being fastened to the upper tracks 24 and the lower plates 78 being fastened to the lower tracks 25. These plates 77, 78 prevent the water from splashing out of the sides of the machine when the machine is in operation.

The frame 20 is provided with side plates 79, 80 at opposite sides thereof extending from the level of the upper run of the conveyer upward above the level of the brushes 46. The cross member 52 is provided with a number of suspended downwardly projecting brackets 81 and to the lower ends of these brackets and to the side plate 80 are fastened brushes 82, there being sufficient space between the brushes 82 and rotary brushes 46 to accommodate the fruit bodies being washed, several fruit bodies being indicated at 83.

A feed chute 84 is provided at the lower or feed end of the machine extending aslant downward and having its inner end adjacent the upper run of the conveyer brushes 2 so as to direct the fruit onto the conveyer. A discharge chute or table 85 is provided adjacent the discharge or upper end of the machine to receive the fruit as it discharges from the conveyer.

In practice, assuming that power is being applied to turn the pulley 37, the transverse brushes 2 will be caused to rotate in the direction of the arrow b, Fig. 1, and the upper run of the conveyer will travel in the direction of the arrow a. Also the longitudinal brushes 46 will be caused to turn in the direction of the arrow c, Fig. 3. The valves 72, 73 will be opened to supply water to the nozzles 67, 68, and the fruit will be conveyed from the feed chute or table 84 to the upper run of the conveyer. By referring to Fig. 3 it is clear that rotation of the brushes 2 in the direction noted above will tend to cause the fruit bodies 83 to rotate counterclockwise viewed from the right of the machine and will carry the fruit against the longitudinal rotary brushes 46. The brushes 46 rotating in the direction noted above, will tend to cause clockwise rotation of the fruit bodies 83 in Fig. 3, and these two turning impulses on the fruit, when thus combined, will cause all portions of the surface of the fruit to contact with the brushes 2 and also the brushes 46 quite frequently during the bodily movement forward of the fruit as it is being conveyed by the forward movement of the brushes 2. The fruit is held substantially continuously against the rotary brushes 46, but when for any reason the fruit moves away from said brushes it will be checked against moving any great distance by the stationary brushes 82 which also effect a scrubbing and washing action on the fruit when the fruit thus engages said brushes. These brushes 82 also serve to slow down the turning of the fruit 83 while effecting the scrubbing action so that the scrubbing action of the brushes 2 and 46 will be more effective than it would be if the fruit continued to rotate at the same speed as the brushes 2 and 46. Thus the fruit is provided on two sides thereof with rotary brushes and on a third side with stationary brushes, but it is clear that the scrubbing action of the brushes 2, 46 would be effective even though the brushes 82 were omitted, and therefore the invention includes a construction in which the brushes 82 may be omitted, if desired. Thus the brushes 46, 82 form passages therebetween for the fruit and the fruit bodies will be caused to pass in single file through said passages and turned continuously.

Water from the nozzles 67 is sprayed onto the brushes 2, 46, 82 and onto the fruit 83, as it passes through the machine so as to aid in removing the dirt from the fruit. The surplus water passes from the brushes and fruit to the trays 75, 76 and the water drains from the tray 75 into the tray 76 and from the tray 76 through a drain-pipe 86.

From the foregoing it is clear that I have provided means for conveying, rotating and laterally moving the fruit and that said means include rotary washing brushes that contact with the fruit on two sides thereof.

During the operation of the machine the dirty water from the fruit and upper run of the conveyer falls into the pan 75, and is thus prevented from coming in contact with the brushes on the lower run of the conveyer. By means of the lower nozzles 68 the brushes of the lower run of the conveyer are washed and foreign matter carried thereby is prevented from being carried around and into contact with the fruit on the upper run of the conveyer.

When the fruit reaches the upper end of the conveyer it has been thoroughly washed and may be removed or will discharge upon the table or platform 85.

Owing to the provision of the stepped pulleys it is clear that when the fruit is extremely dirty the brushes may be caused to rotate rapidly without changing the speed of rotation of the conveyer. When the fruit is only slightly soiled the brushes may be rotated at a lower rate of speed.

The fruit passes in rows or files through the passages 87, the sides of which are formed by the brushes 46, 82 and the bottom by the transverse brushes 2. By reason of the provision of the brushes 46, 82 each row of fruit bodies will be prevented from coming in contact with any other row of fruit bodies, and therefore if the fruit is fed at a certain rate of speed to the machine, relative to the speed of the conveyer 1, the fruit bodies may be caused to pass through the machine without coming in contact with one another, thus facilitating the washing and scrubbing operation and also eliminating any chance of the fruit becoming bruised by reason of the fruit bodies knocking and rubbing against one another.

From the preceding description of the operation of the machine it is seen that the fruit bodies are caused to move in separate rows while they are being washed and scrubbed, and that the fruit bodies are caused to turn in various directions while being scrubbed in separate rows.

It is understood that modifications of the construction above set forth may be made without departing from the spirit and scope of the invention as defined in the appended claims.

In some instances it may not be necessary to use water for cleaning the fruit and therefore, when desired, the spray nozzles may be omitted, and it is understood that the invention includes a construction in which the spray nozzles are omitted.

I claim:

1. A fruit cleaner comprising a frame, rotary cleaning and fruit-supporting brushes mounted on said frame, means to rotate said brushes, means to move the brushes along the frame, longitudinally extending rotary brushes above the fruit-supporting brushes forming passages for the fruit, and means to rotate the longitudinal brushes.

2. A fruit cleaner comprising a frame, rotary cleaning and fruit-supporting brushes mounted on said frame, means to rotate said brushes, means to move the brushes along the frame, longitudinally extending rotary and stationary brushes alternately arranged above the fruit-supporting brushes to form passages for the fruit, and means to rotate the longitudinal rotary brushes.

3. A fruit cleaner comprising a frame, rotary cleaning and fruit-supporting brushes mounted on said frame, means to rotate said brushes, means to move the brushes along the frame, said brushes having irregular fruit-engaging surfaces, longitudinally extending rotary brushes above the fruit-supporting brushes forming passages therebetween for the fruit, and means to rotate the longitudinal brushes.

4. A fruit cleaner comprising a frame, rotary cleaning and fruit-supporting brushes mounted on said frame, said brushes having irregular fruit-engaging surfaces, means to rotate said brushes, means to move the brushes along the frame, longitudinally extending rotary and stationary brushes alternately arranged above the fruit-supporting brushes to form passages for the fruit, and means to rotate the longitudinal rotary brushes.

5. A fruit cleaner comprising a frame, rotary cleaning and fruit-supporting brushes mounted on the frame, means to move the brushes bodily along the frame to convey the fruit, means to rotate the brushes in a direction corresponding to that of the bodily movement thereof, longitudinally extending rotary brushes above the fruit-supporting brushes forming passages for the fruit, and means to rotate the longitudinal brushes.

6. A fruit cleaner comprising a frame, rotary cleaning and fruit-supporting brushes mounted on the frame, means to move the brushes bodily along the frame to convey the fruit, means to rotate the brushes in a direction corresponding to that of the bodily movement thereof, longitudinally extending rotary and stationary brushes above the fruit-supporting brushes forming passages for the fruit, and means to rotate the longitudinal rotary brushes.

7. A fruit cleaner comprising a frame, rotary cleaning and fruit-supporting brushes mounted on the frame, means to rotate the brushes to turn over and clean the fruit thereon, means to move the brushes along the frame to convey the fruit, longitudinally extending rotary brushes above the fruit-supporting brushes forming passages for the fruit, and means to spray a fluid on the fruit while it is upon the fruit-supporting brushes.

8. A fruit cleaner comprising a frame, an inclined conveyer mounted on the frame, said conveyer comprising a plurality of rotary fruit-supporting brushes, means to rotate the brushes, means to rotate the conveyer, and longitudinally extending rotary brushes above the fruit-supporting brushes forming passages for the fruit.

9. A fruit cleaner comprising a frame, rotary cleaning and fruit-supporting brushes mounted on said frame and provided with spiral grooves therein, means to rotate said brushes, means to move the brushes along the frame, longitudinally extending rotary brushes above the fruit-supporting brushes forming passages for the fruit, and means to rotate the longitudinal brushes.

10. A fruit cleaner comprising a frame, rotary cleaning and fruit-supporting brushes mounted on said frame and provided with spiral grooves therein running in the same direction as one another, means to rotate said brushes, means to move the brushes along the frame, longitudinally extending rotary brushes above the fruit-supporting brushes forming passages for the fruit, and means to rotate the longitudinal brushes.

11. A fruit cleaner comprising a frame, rotary cleaning and fruit-supporting brushes mounted on said frame and provided with spiral grooves therein, means to rotate said brushes, means to move the brushes along the frame, longitudinally extending rotary and stationary brushes alternately arranged above the fruit-supporting brushes and forming passages for the fruit, and means to rotate the longitudinal rotary brushes.

12. A fruit cleaner comprising a frame, rotary cleaning and fruit-supporting brushes mounted on said frame and provided with spiral grooves therein running in the same direction as one another, means to rotate said brushes, means to move the brushes along the frame, longitudinally extending rotary and stationary brushes alternately arranged above the fruit-supporting brushes and forming passages for the fruit and means to rotate the longitudinal rotary brushes.

13. A fruit cleaner comprising a frame, a conveyer mounted on the frame, said conveyer having a plurality of rotary fruit-supporting and cleaning members, means to rotate the members to rotate and clean the fruit contacting therewith, said members having irregular fruit-engaging surfaces, and longitudinally extending rotating brushes above the fruit-supporting members forming passages for the fruit.

14. A fruit cleaner comprising a frame, a conveyer mounted on the frame, said conveyer having a plurality of rotary fruit-supporting members, means to rotate the members to rotate the fruit contacting therewith, said members having spiral grooves therein, the spiral grooves being of like construction in all of said members, and longitudinally extending brushes above the fruit-supporting members forming passages for the fruit.

15. A fruit cleaner comprising a frame, a conveyer mounted on the frame, said conveyer having a plurality of rotary fruit-supporting and cleaning members, means to rotate the members to rotate and wash the fruit contacting therewith, said members having spiral grooves therein, longitudinally extending rotary brushes above the fruit-supporting members forming passages for the fruit, and means to rotate said brushes.

16. A fruit cleaner comprising a frame, a longitudinally moving conveyer having a plurality of rotary fruit-supporting cleaning members, means for moving the conveyer, means for rotating said members independent of the movement of said conveyer, and longitudinally extending rotary brushes above the fruit-supporting cleaning members forming passages for the fruit.

17. A fruit cleaning machine having means for longitudinally conveying fruit through the machine, including rotary brushes, means for moving said conveying means, means for rotating said brushes independently of the movement of the conveyer, the fruit being moved laterally with respect to the surface of said brushes while moving along thereby, longitudinally extending rotary cleaning members above the fruit-supporting cleaning members forming passages for the fruit, and means to rotate the longitudinal rotary cleaning members.

18. A fruit cleaning machine having a conveyer, including rotary cleaning brushes arranged parallel to each other and transverse to the line of movement of the conveyer, means for rotating the brushes, the rotation of said brushes simultaneously causing relative movement between said brushes and the fruit thereon transverse to the direction of bodily movement of said brushes, longitudinally extending rotary cleaning brushes above the transverse brushes forming passages for the fruit, and means to rotate the longitudinal rotary brushes.

19. In a fruit cleaning machine, fruit-supporting and conveying means, including rotary brushes, means to operate the conveying means, rotary fruit-cleaning members extending in the direction of travel of the conveying means and forming passages for the fruit, and means to rotate the fruit-cleaning members.

20. In a fruit cleaning machine, fruit-supporting and conveying means, including rotary brushes, means to operate the conveying means, a rotary fruit-cleaning member extending in the direction of travel of the conveying means, another fruit-cleaning member extending longitudinally in spaced relation to the rotary member to form with the rotary member a passage for the fruit, and means to rotate the rotary fruit-cleaning member.

21. A fruit cleaner comprising a frame, means to convey fruit along the frame, said means including traveling rotary brushes, longitudinally extending brushes above the fruit-conveying means forming passages for the fruit, and means to rotate the brushes.

22. A fruit cleaner comprising a frame, means to convey fruit along the frame, longitudinally extending rotary and stationary brushes alternately arranged above the fruit-conveying means and forming passages for the fruit, and means to rotate the rotary brushes.

23. A fruit cleaner comprising a frame, rotary fruit-supporting members mounted on said frame, means to rotate the fruit-supporting members, means to move the fruit-supporting members along the frame, longitudinally extending rotary brushes above the fruit-supporting members forming passages for the fruit, and means to rotate the brushes.

24. A fruit cleaner comprising a frame, rotary fruit-supporting members mounted on said frame, means to rotate the fruit-supporting members, means to move the fruit-supporting members along the frame, longitudinally extending rotary and stationary brushes alternately arranged above the fruit-supporting members and forming passages for the fruit, and means to rotate the rotary brushes.

25. A fruit cleaner comprising a frame, rotary fruit-supporting members mounted on the frame, means to move the fruit-supporting members bodily along the frame to convey the fruit, means to rotate the fruit-supporting members in a direction corresponding to that of the bodily movement thereof to turn the fruit, longitudinally extending rotary brushes above the fruit-supporting members forming passages for the fruit, and means to rotate the brushes.

26. A fruit cleaner comprising a frame, rotary fruit-supporting members mounted on the frame, means to move the fruit-supporting members bodily along the frame to convey the fruit, means to rotate the fruit-supporting members in a direction corresponding to that of the bodily movement thereof to turn the fruit, longitudinally extending rotary and stationary brushes alternately arranged above the fruit-supporting members forming passages for the fruit, and means to rotate the rotary brushes.

Signed at Los Angeles, California, this 4th day of May, 1918.

FRED STEBLER.

Witnesses:
GEORGE H. HILS,
L. BELLE WEAVER.